United States Patent
Ho et al.

(10) Patent No.: US 10,601,107 B2
(45) Date of Patent: Mar. 24, 2020

(54) ENCLOSURE WITH INTEGRATED ANTENNA, SUCH AS A PRINTER WITH AN ANTENNA INTEGRATED IN A PRINTER HOUSING USED TO COMMUNICATE WIRELESSLY WITH AN ELECTRONIC DEVICE

(71) Applicant: INTERMEC IP CORP., Everett, WA (US)

(72) Inventors: Wai Kit Ho, Jalan Rajawali (SG); Adriel Kee Fatt Siew, Jalan Jurong Kechil (SG); Ranuff Delario, Casa Merah (SG); Ling Ying Koh, Punggol Field (SG)

(73) Assignee: INTERMEC IP CORP., Everett, WA (US)

( * ) Notice: Subject to any disclaimer, the term of this patent is extended or adjusted under 35 U.S.C. 154(b) by 53 days.

(21) Appl. No.: 14/496,582

(22) Filed: Sep. 25, 2014

(65) Prior Publication Data

US 2015/0085319 A1 Mar. 26, 2015

Related U.S. Application Data

(60) Provisional application No. 61/882,554, filed on Sep. 25, 2013.

(51) Int. Cl.
 *H01Q 1/24* (2006.01)
 *G06F 3/12* (2006.01)
 (Continued)

(52) U.S. Cl.
 CPC ............. *H01Q 1/24* (2013.01); *H01Q 1/22* (2013.01); *H01Q 1/36* (2013.01); *H01Q 1/40* (2013.01); *G06K 15/40* (2013.01)

(58) Field of Classification Search
 CPC .......... G06F 3/1292; H01Q 1/24; H01Q 1/36; H01Q 1/40; H01Q 1/22; B41J 29/00; G06K 15/40
 (Continued)

(56) References Cited

U.S. PATENT DOCUMENTS

2002/0044164 A1*  4/2002  Kaburagi ............... B41J 29/393
 347/2
2008/0137138 A1*  6/2008  Matoba ........................ 358/1.15
 (Continued)

OTHER PUBLICATIONS

O. M. C. Pereira-Filho, T. B. Ventura, C. G. Rego, A. F. Tinoco-S., and J. C. da S. Lacava (2011). CavityBacked Cylindrical Wraparound Antennas, Microstrip Antennas, Prof. Nasimuddin Nasimuddin (Ed.), ISBN: 978-953-307-247-0, InTech, Available from: http://www.intechopen.com/books/microstrip-antennas/cavitybacked-cylindrical-wraparound-antennas.*

Primary Examiner — Eric A. Rust
(74) Attorney, Agent, or Firm — Oliff PLC; R. Brian Drozd

(57) ABSTRACT

A printing apparatus is described that comprises an antenna configured to intercept radio waves modulated with printing data; a receiver configured to recover the printing data from the intercepted radio waves; a printing module configured to generate a printed output on a printing medium based on the printing data; and a housing for the printing apparatus, wherein the housing encloses the antenna, the receiver, and the printing module, and further wherein the antenna is integrated with an interior surface of the housing.

20 Claims, 8 Drawing Sheets

(51) Int. Cl.
*H01Q 1/40* (2006.01)
*H01Q 1/36* (2006.01)
*H01Q 1/22* (2006.01)
*G06K 15/00* (2006.01)

(58) Field of Classification Search
USPC .......................................................... 358/1.15
See application file for complete search history.

(56) References Cited

U.S. PATENT DOCUMENTS

| | | | |
|---|---|---|---|
| 2009/0243942 A1* | 10/2009 | Autti | 343/702 |
| 2012/0122519 A1* | 5/2012 | Jochheim | 455/556.1 |
| 2014/0185085 A1* | 7/2014 | Rhodus et al. | 358/1.15 |
| 2014/0360143 A1* | 12/2014 | Bush | 55/304 |

\* cited by examiner

ENCLOSURE WITH INTEGRATED ANTENNA, SUCH AS A PRINTER WITH AN ANTENNA INTEGRATED IN A PRINTER HOUSING USED TO COMMUNICATE WIRELESSLY WITH AN ELECTRONIC DEVICE

CROSS-REFERENCE TO RELATED APPLICATIONS

This application claims priority to U.S. Application No. 61/882,554, filed Sep. 25, 2013, the contents of which is incorporated by reference in its entirety.

BACKGROUND

Many electronic machines, such as printers, scanners, and copiers, are configured to receive and transmit wireless communications to electronic devices, such as a computer. The machines use wireless protocols, such as IEEE 802.11 or Bluetooth, to transmit and receive information via the use of either an internal antenna or external antenna. However, the machines typically have metallic components, such as a motor, springs, frames, and screws, that interfere with wireless signals to be received or transmitted by the machine's antenna. As a result, signals originating from certain directions may not be sufficiently strong to be received error-free by the machine, and signals transmitted by the machine's antenna may, likewise, not be strong enough to reach an intended electronic device in the same directions.

BRIEF DESCRIPTION OF THE DRAWINGS

Examples of a machine having an antenna used for wireless communication integrated into a non-conductive housing of the machine are illustrated in the figures. The examples and figures are illustrative rather than limiting.

DETAILED DESCRIPTION

A machine is described that wirelessly communicates with electronic devices via an antenna mechanically secured to an inside surface of a housing of the machine. The antenna is integrated with the housing surface through a molded interconnect device (MID) process, and may be supported by and formed within the housing, or adjacent to an interior surface of the housing, during manufacture. By positioning the antenna within or at the inside surface of the housing, interference of radiation signals to be received by or transmitted from the antenna with metallic components of the machine is minimized, as compared to the interference of signals that may be experienced by an internal antenna positioned among the components of the machine. Further, the antenna integrated with the housing can be designed to wrap around the interior of the housing or around certain portions of the machine, such that the radiation pattern for the antenna does not suffer from significant signal power reduction in any particular direction due to interference issues. Moreover, the antenna may be positioned at an upper area or portion of the electrical device (or other location) to more efficiently receive or transmit wireless signals.

Various aspects and examples of the technology will now be described. The following description provides specific details for a thorough understanding and enabling description of these examples. One skilled in the art will understand, however, that the technology may be practiced without many of these details. Additionally, some well-known structures or functions may not be shown or described in detail, so as to avoid unnecessarily obscuring the relevant description. The terminology used in the description presented below is intended to be interpreted in its broadest reasonable manner, even though it is being used in conjunction with a detailed description of certain specific examples of the technology. Certain terms may even be emphasized below; however, any terminology intended to be interpreted in any restricted manner will be overtly and specifically defined as such in this Detailed Description section.

Illustrative Environments

Figure 1A:
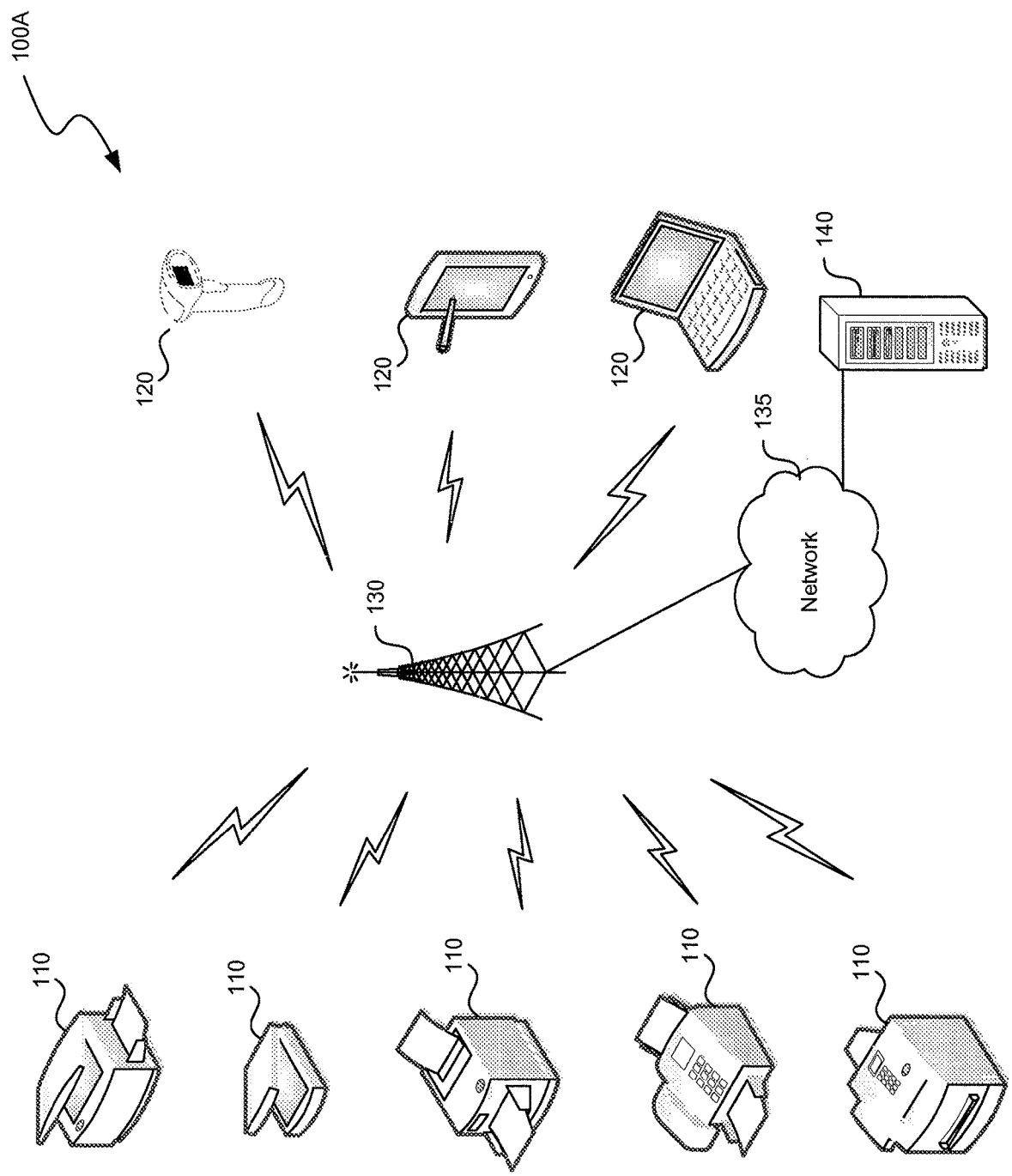
FIG. 1A is a block diagram illustrating an example environment in which a machine with an antenna integrated in its enclosure can interact wirelessly with electronic devices.
Figure 1B:
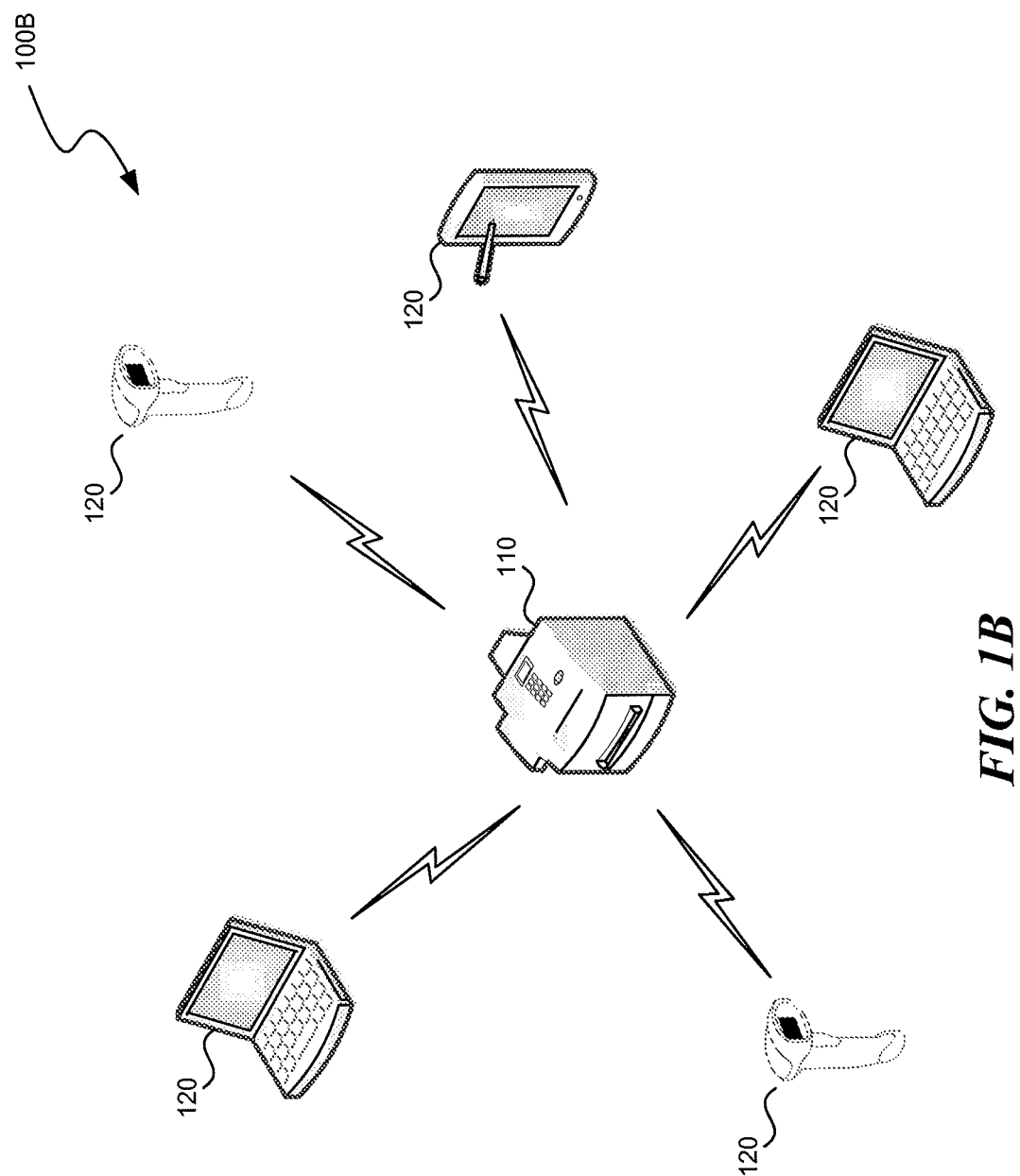
FIG. 1B is a block diagram illustrating another example environment in which a machine with an antenna integrated in its enclosure can interact wirelessly with electronic devices via Bluetooth.

FIGS. 1A and 1B and the following discussion provide a brief, general description of example environments 100A, 100B in which a machine having an antenna integrated with the machine's enclosure can be advantageously implemented. The environments 100A and 100B each include a machine 110 and an electronic device 120. The machine 110 can be a printer, such as a barcode printer or a thermal printer; a storage device; a multi-purpose office machine; an appliance (e.g., a refrigerator, an oven, etc.); an industrial machine; or another machine capable of wireless communication. The electronic device 120 can be mobile or positioned in a fixed location. For example, the electronic device 120 can be a barcode scanner, a smartphone, a tablet computer, a laptop, a personal computer, or another device capable of wireless communication. The machine 110 and electronic device 120 communicate with each other wirelessly, e.g. using IEEE 802.11 protocols or another wireless standard via an access point 130, as shown in FIG. 1A. Alternatively or additionally, the machine 110 and electronic device 120 can directly communicate wirelessly via Bluetooth, as shown in FIG. 1B.

In some implementations, the access point 130 communicates with a server computer and/or third party server computer 140 via a network 135. The electronic device 120 utilizes applications or other software, which operate through the use of computer executable instructions. Such applications may be directed toward wirelessly communicating with the machine 110.

Although not required, aspects and implementations of the technology will generally be described in the general context of computer-executable instructions, such as routines executed by the machine 110 and the electronic device 120, or other computing systems. The technology can also be embodied in a special purpose computer or data processor that is specifically programmed, configured, or constructed to perform one or more of the computer-executable instructions explained in detail herein. Indeed, the terms "computer," "computing device," and "machine," as used generally herein, refer to devices that have a processor and non-transitory memory, like any of the above devices, as well as any data processor or any device capable of communicating with a network. Data processors include programmable general-purpose or special-purpose microprocessors, programmable controllers, application-specific integrated circuits (ASICs), programmable logic devices (PLDs), or the like, or a combination of such devices. Computer-executable instructions may be stored in memory, such as random access memory (RAM), read-only memory (ROM), flash memory, or the like, or a combination of such components. Computer-executable instructions may also be stored in one or more storage devices, such as magnetic or optical-based disks, flash memory devices, or any other type of non-volatile storage medium or nontransitory medium for data. Computer-executable instructions may include one or more program modules, which include routines, programs, objects, components, data structures, and so on that perform particular tasks or implement particular abstract data types.

While aspects of the invention, such as certain functions, are described as being performed exclusively on a single device or machine, the technology can also be practiced in distributed environments where functions or modules are shared among disparate processing devices, which are linked through a communications network, such as a Local Area Network (LAN), Wide Area Network (WAN), or the Internet. In a distributed computing environment, program modules may be located in both local and remote memory storage devices.

Aspects of the invention may be stored or distributed on computer-readable media, including magnetically or optically readable computer discs, hardwired or preprogrammed chips (e.g., EEPROM semiconductor chips), nanotechnology memory, biological memory, or other data storage media. Alternatively, computer implemented instructions, data structures, screen displays, and other data under aspects of the invention may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

Wireless Communication with the Machine

Figure 2:
FIG. 2 shows an example barcode printer that can wirelessly communicate with electronic devices.

The discussion below will use a printer as a specific example of machine 110, however, the discussion regarding wireless communication with the printer also applies to any other type of machine 110. FIG. 2 shows an example barcode printer 110 that can wirelessly communicate with electronic devices 120, e.g., via Bluetooth, IEEE 802.11 protocol, and/or any other wireless standard. Examples of electronic devices 120 that can send data to the printer 110 for printing include a barcode scanner, a computer, and a mobile device, such as a smartphone or tablet. The electronic devices 120 can also receive wireless communications from the printer 110, such as an acknowledgement that a print request has been completed, or print settings.

Figure 3:
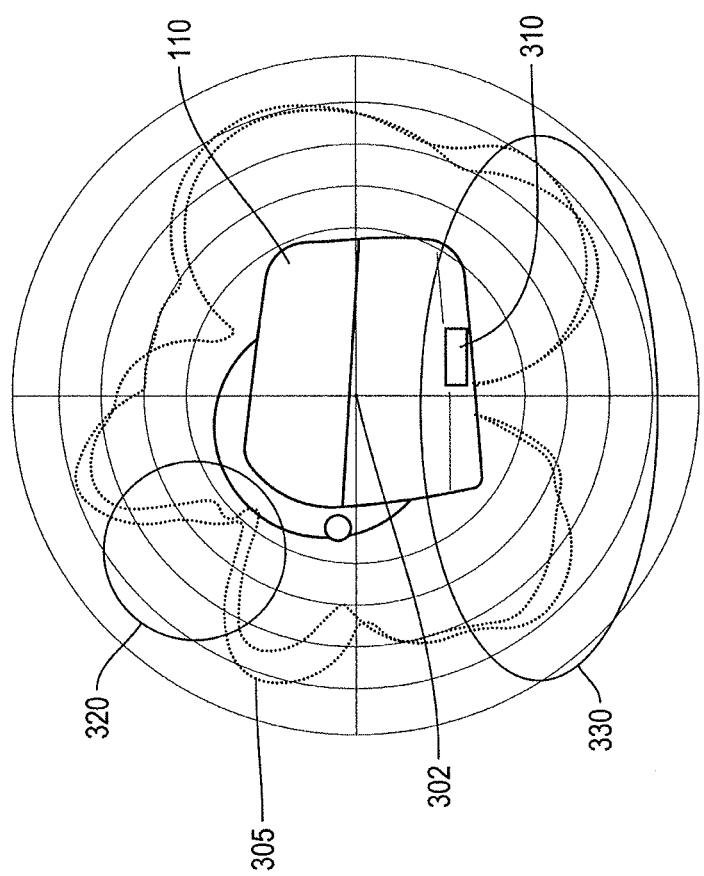
FIG. 3 shows an example of a radiation pattern of a prior art printer that communicates wirelessly with electronic devices.

FIG. 3 shows example radiation patterns 305 of a printer 110 that uses an internal antenna 310 located near a middle edge of the base of the printer 110 to communicate wirelessly with electronic devices 120. For both IEEE 802.11 protocol and Bluetooth protocol communications, the radiation signal received by and transmitted from the internal antenna 310 is sensitive to and affected by metal structures of the printer 110, such as a stepper motor or a thermal print head. In the example of FIG. 3, the strength of radiation emitted from or received by the internal antenna 310 in a particular direction is proportional to the radial distance from the origin 302 of the radiation pattern 305 in that particular direction. The strength of the radiation signal shows a dip in two specific directions, at −450 (shown within the circle 320) and at 1800 (shown within the oval 330). The reduction in radiation signal strength is due to interference with the metal components of the printer.

In some implementations, the drop in radiation signal strength can be remedied by changing the position of the internal antenna 310 within the printer 110 or even using an external antenna, rather than an internal antenna. However, neither of these solutions completely eliminate the interference caused by the metal components of the printer itself. Additionally, an external antenna requires a larger volume of space for the printer. To avoid interference with internal metallic components of the printer, the conductive antenna structures and related electronic components can be directly integrated into the outer non-conductive or plastic shell of the printer 110. One way to integrate the antenna into the plastic enclosure of the printer is to use a molded interconnect device (MID) process. As is known to a person of skill in the art, in some implementations, the MID process injection molds a polymer compounded with a laser-sensitive metal complex into a desired shape for the part. When the polymer is exposed to laser light, the metal complex is broken down into elemental metal. The laser is directed to etch a specific circuit pattern on the surface of the part, leaving behind a roughened surface with embedded metal particles in the circuit pattern. Then the roughened surface is electrolessly plated with a conductive metal, such as copper. Thus, the MID process can be used to integrate the antenna with the inner surface of the housing of the printer.

In the case of a wirelessly communicating machine, the MID process can be used to mechanically couple or secure an antenna structure and other electronic coupling components to the inside surface of the housing of a printer or any other machine that uses wireless communication. Examples of types of antennas or antenna elements that can be integrated with the enclosure include micro-strip antennas, printed antennas, and patch antennas.

Figure 4A:
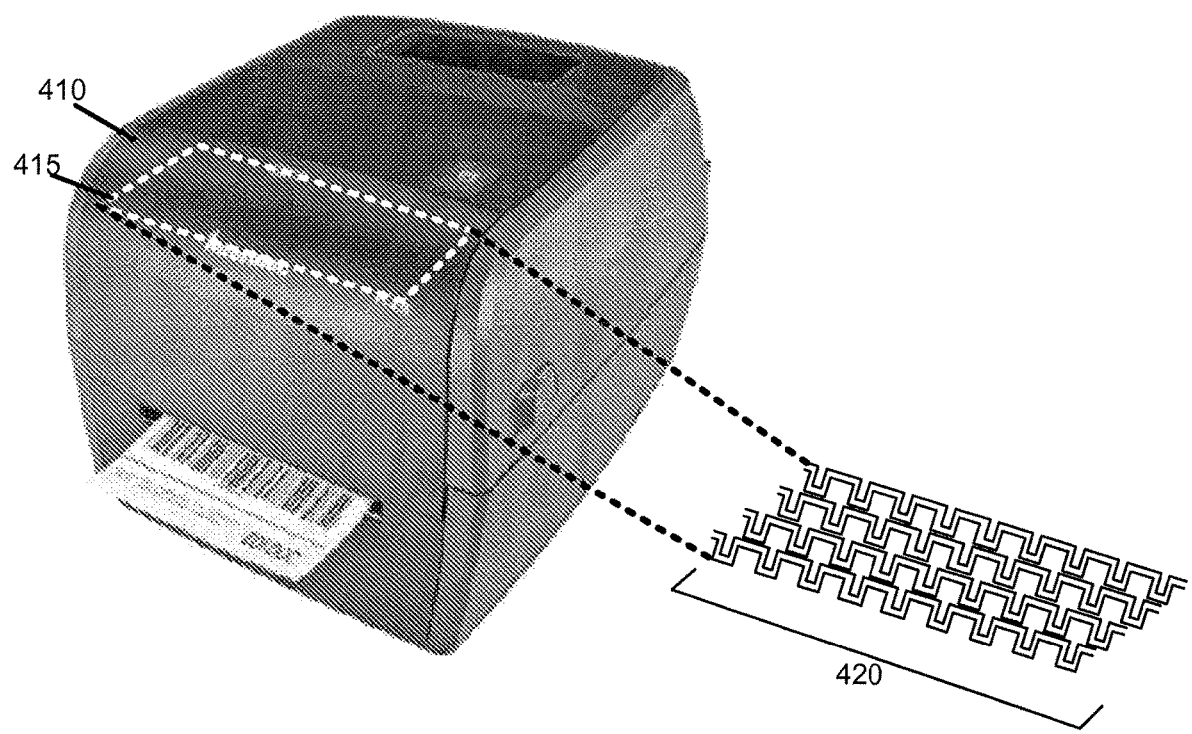
FIG. 4A shows an example antenna integrated with an enclosure of a printer.
Figure 4B:
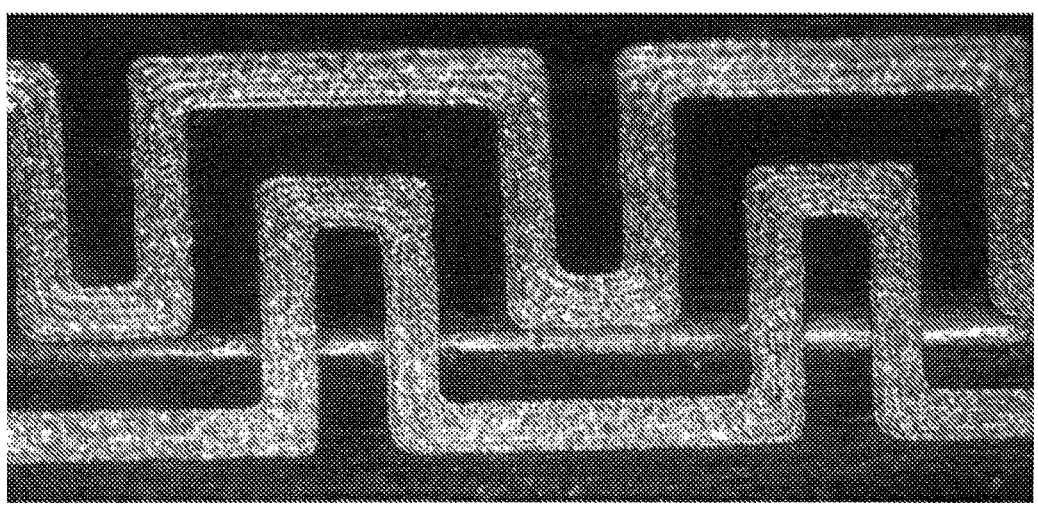
FIG. 4B shows a close-up of an example antenna that can be integrated in a printer housing.

FIG. 4A shows a portion of an example antenna 420 integrated with a top portion of an enclosure 410 of a printer. The antenna 420 is attached to the inside surface of the top portion of the enclosure 410 in an area indicated by the dotted rectangle 415. Thus, the antenna 420 shown in FIG. 4A is what would be seen if the top enclosure covering the printer were removed and the inside surface were visible. FIG. 4B shows a close-up of an example antenna that can be integrated in a printer housing. The positioning of the antenna 420 at the top portion of the housing may provide the best antenna radiation pattern. However, the antenna 420 can be attached to any portion of the printer housing, such as the bottom portion or a side portion, or any appropriate combination of inside surfaces of the housing. Additionally, to optimize performance of the antenna, it should be placed as far as possible from any metal components in the printer. By placing the antenna 420 on the inside of the enclosure 410, the antenna 420 can radiate away from the printer without encountering any metallic components that interfere with the radiation. Consequently, the radiation pattern of the antenna will not exhibit a strong reduction in radiation signal strength due to interference, advantageously resulting in a more uniform radiation pattern.

To be effective in providing a substantially uniform radiation pattern in all directions, the antenna integrated with the enclosure is designed to encircle the printer, or to cover a large area of a top portion of the printer, as shown in FIG. 4A. Then the radiation pattern of the antenna is less likely to exhibit decreased signal strength in any particular direction. However, even if the antenna were to only encircle a portion of the printer, the resulting radiation pattern will be more uniform than that of a standard internal antenna. The antenna can have any shape and/or dimension that produces a suitable antenna radiation pattern.

In some implementations, rather than using the MID process to integrate the antenna with the housing of the printer, the antenna and related electronic components can be printed on a non-conductive piece of adhesive film, and the adhesive film can be adhered to the inside of the housing. As with the MID process antenna, the adhesive film antenna can have any shape and/or dimension and be placed in any location on the housing that produces a suitable antenna radiation pattern for the printer. In some other implementations, the antenna, whether applied to a plastic layer of the housing with the MID process or adhered using adhesive film, can be sandwiched between injection-molded non-conductive layers of the housing.

Figure 5A:
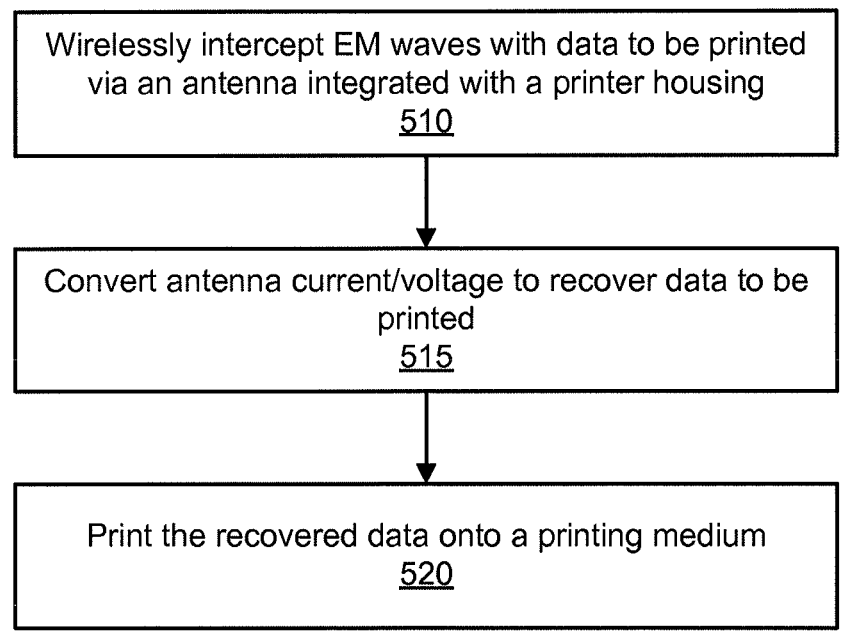
FIG. 5A is a flow diagram illustrating an example process of wirelessly receiving data for printing via an antenna integrated in an enclosure of the printer.

By integrating the antenna with the enclosure of the printer, the printer can more effectively receive and/or transmit wireless signals. Thus, the printer can be more effective in performing printing-related functions. For example, FIG. 5A is a flow diagram illustrating an example process of wirelessly receiving data for printing via an antenna integrated in an enclosure of the printer.

At block 510, the printer wirelessly intercepts via an antenna integrated with an enclosure of the printer electromagnetic waves in the radio wave frequency range that are modulated with the data to be printed. Because the printer is using an antenna integrated with the printer housing, the radiation pattern of the antenna is likely to have a substantially uniform radiation pattern. Thus, the printer does not need to be oriented in any particular direction to optimize reception of the wireless data signal. The antenna produces an alternating current at its terminals proportional to the intercepted electromagnetic waves.

Then at block 515, a receiver in the printer extracts the data to be printed from the alternating current produced by the antenna. In some implementations, the receiver includes electronic filters to filter out the desired radio frequency signal from all the signals that the antenna picked up; an electronic amplifier to increase the power of the filtered signal for processing; and a demodulator to recover the information content from a modulated carrier wave.

Next, at block 520, the printer prints the extracted data onto a suitable printing medium. For example, the printer can be a thermal printer that uses a thermal transfer process or direct thermal printing process to print the data on a label made of paper or thermal paper, respectively.

Figure 5B:
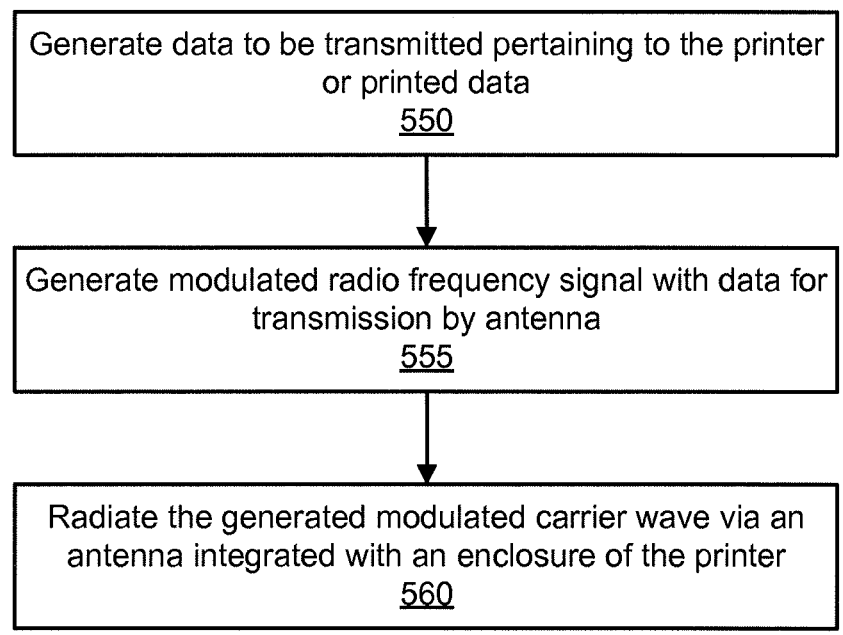
FIG. 5B is a flow diagram illustrating an example process of wirelessly transmitting data from a printer via an antenna integrated in an enclosure of the printer.

FIG. 5B is a flow diagram illustrating an example process of wirelessly transmitting data from a printer via an antenna integrated in an enclosure of the printer.

At block 550, a processor in the printer generates the data to be transmitted. The data can be related to the printer or the data that the printer has printed. For example, the printer can send an acknowledgement that a print request has finished, or a message that the printer has run out of printing medium for printing.

Next, at block 555, a transmitter in the printer generates a radio frequency signal that is modulated with the data to be transmitted. In some implementations, the transmitter includes an electronic oscillator circuit to generate a radio frequency signal or the carrier wave; a modulator to modulate the carrier wave with the data to be transmitted; an amplifier to increase the power of the signal; and an antenna tuner circuit to match the impedance of the transmitter to the impedance of the antenna.

Then at block 560, the antenna integrated with the enclosure of the printer radiates the modulated carrier wave with the data to be received by an electronic device. The electronic device can be the same device that initiated the print request or any other device that is waiting to submit a print request.

Figure 6:
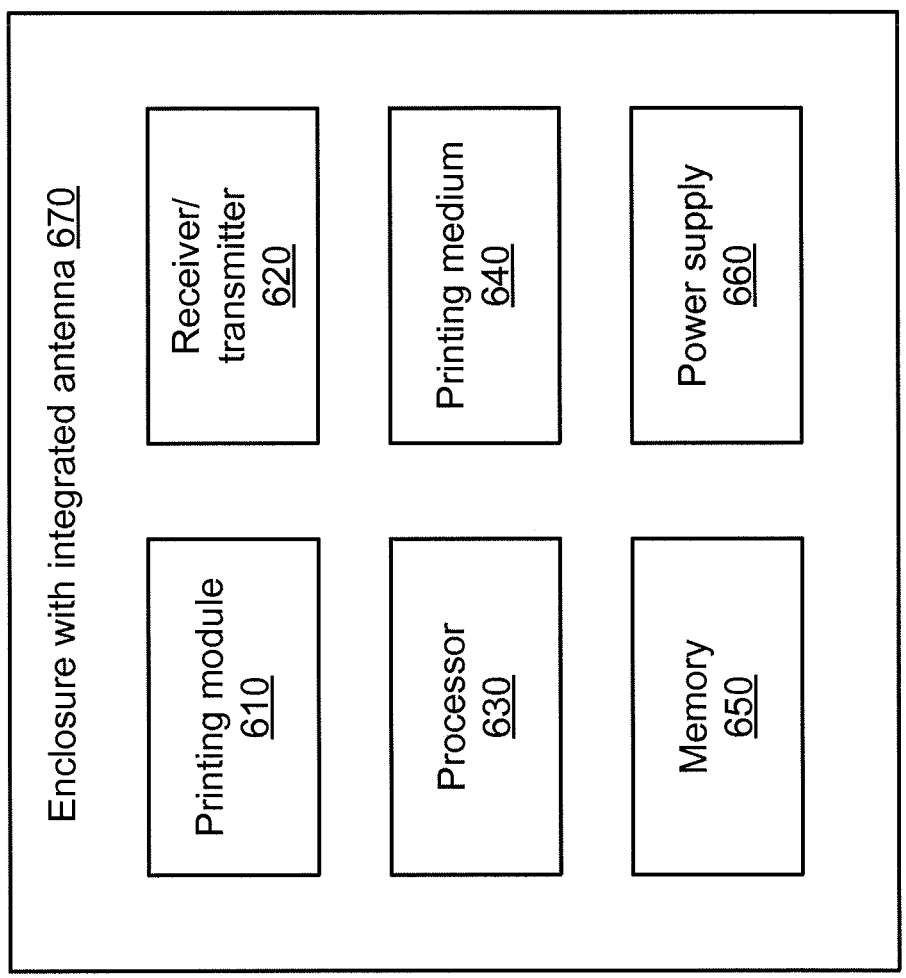
FIG. 6 shows an example block diagram of components of a printer system used to wirelessly communicate data using an antenna integrated in an enclosure of the printer.

FIG. 6 shows an example block diagram of components of a printer machine used to wirelessly receive and/or transmit data using an antenna integrated in an enclosure of the printer. The system can include a printing module 610, a receiver/transmitter 620, a processor 630, a printing medium 640, a memory 650, a power supply 660, and an enclosure with integrated antenna 670.

The printing module 610 can be a thermal transfer printer, a direct thermal printer, a laser printer, or any type of printer. The printing module 610 can print barcode labels, or any type of data. The printing medium 640 upon which the printing module 610 prints data can be paper, thermal paper, labels, and/or MD (radio frequency identification) tags.

The receiver/transmitter 620 can include a receiver for receiving data for printing or data for use in initializing the printer for printing data, a transmitter for transmitting data related to the printer and/or printed data, and/or a transceiver having the functionality of both the receiver and the transmitter.

The enclosure with the integrated antenna 670 can be a non-conductive housing for the printer. The enclosure can be made from plastic or a polymer material suitable for use in a MID process whereby a suitably designed antenna can be mechanically coupled to the inside surface of the enclosure.

Memory 650 can include but is not limited to, RAM, ROM, and any combination of volatile and non-volatile memory. A power supply 660 can include, but is not limited to, a battery.

Figure 7:
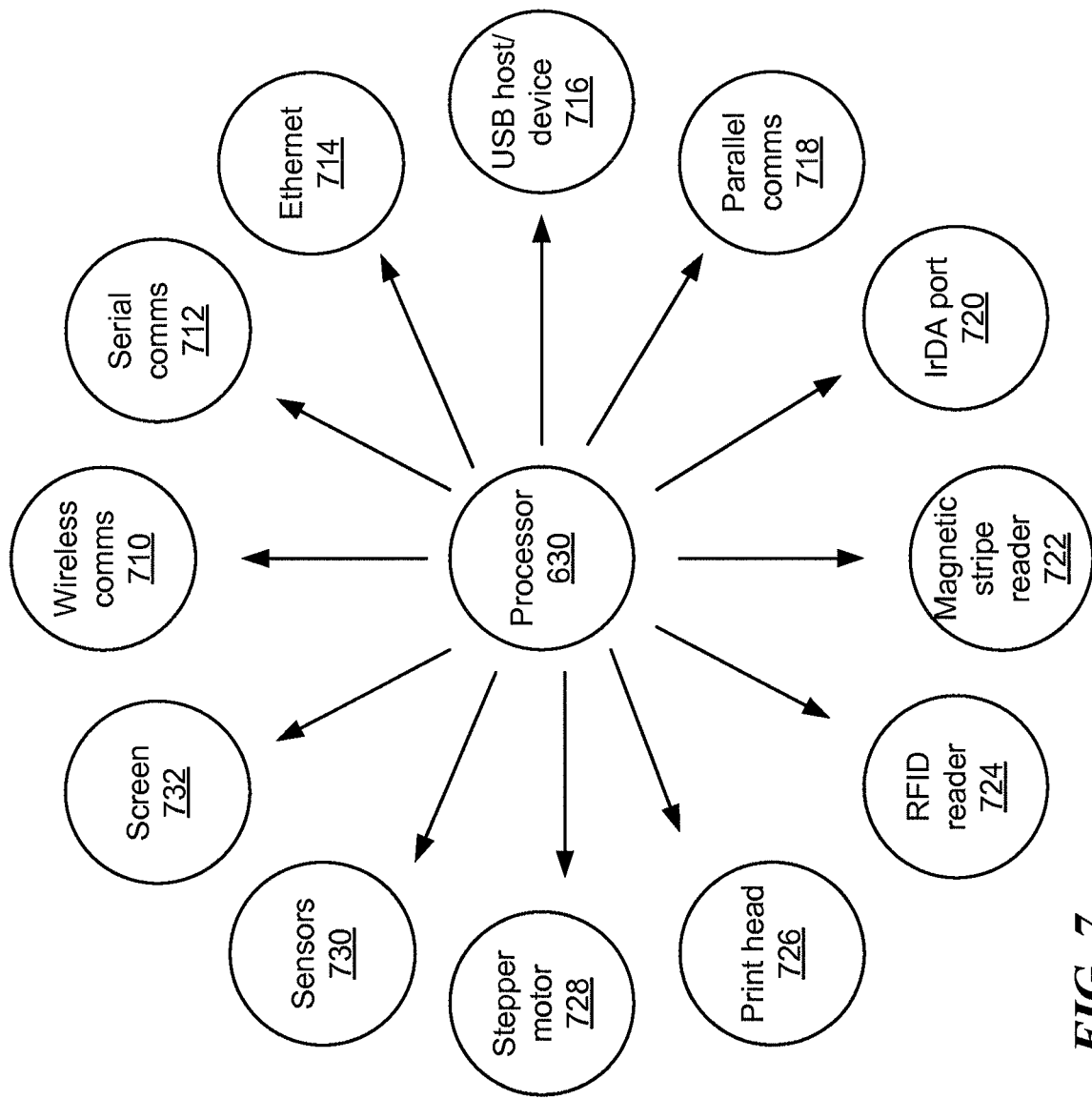
FIG. 7 is a block diagram that shows examples of printer modules with which a printer processor communicates.

The processor 630 can be a microprocessor or any other type of processor used to run functions of the printer. FIG. 7 is a block diagram that shows examples of modules in a printer that the processor 630 can communicate with, such as a wireless communications module 710, a serial communications port 712, an Ethernet port 714, a USB (universal serial bus) port 716, a parallel communications port 718, an IrDA (Infrared Data Association) port 720, a magnetic stripe reader 722, an RFID reader 724, a print head 726, a stepper motor 728, sensors 730 and/or a screen 732.

The wireless communications module 710 has a receiver, transmitter, and/or transceiver, as described above. The serial communications port 712 can be an RS-232 or RS-422 serial interface port through which the printer can communicate with a computer. In some instances, the serial communications port is used to set up the printer and to send commands directly to the printer, using, for example, a serial communications program like HyperTerminal.

The Ethernet port 714 can be used to set up the printer as a network printer. A computer can send commands directly to the printer via an Ethernet cable. The USB port 716 can be used couple the printer to a computer via a USB cable to send commands to the printer. The parallel communications port 718 can be an IEEE 1284 parallel interface port though which the printer can communicate with a computer.

The IrDA port 720 can be used for wireless infrared communication based on IrDA protocols. A device communicating with infrared signals with the printer should be within line-of-sight of the printer for the infrared communication to be successful.

A magnetic stripe reader 722 can be coupled to the printer for reading magnetic stripe payment cards, and the printer can be directed to print receipts for payments made with the payment cards. The RFID reader 724 can be used to read from and write to RFID tags, and the printer can be used to print information obtained from the RFID tags.

The print head 726 transfers ink from a thermal transfer ribbon onto the printing medium, and the stepper motor 728 moves the printing medium relative to the print head 726.

The sensors 730 can include photoelectric sensors that provide information to the processor for controlling feeding of the printing medium in the printer. For example, the sensors can detect gaps between labels or marks on continuous stock. The sensors can also detect whether the printing medium has been removed by a user.

The screen 732 can display feedback to the user, for example, regarding the status of the printer, the status of a print request, prompts for more information, and error messages.

CONCLUSION

Unless the context clearly requires otherwise, throughout the description and the claims, the words "comprise," "comprising," and the like are to be construed in an inclusive sense (i.e., to say, in the sense of "including, but not limited to"), as opposed to an exclusive or exhaustive sense. As used herein, the terms "connected," "coupled," or any variant thereof means any connection or coupling, either direct or indirect, between two or more elements. Such a coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. While processes or blocks are presented in a given order in this application, alternative implementations may perform routines having steps performed in a different order, or employ systems having blocks in a different order. Some processes or blocks may be deleted, moved, added, subdivided, combined, and/or modified to provide alternative or subcombinations. Also, while processes or blocks are at times shown as being performed in series, these processes or blocks may instead be performed or implemented in parallel, or may be performed at different times. Further any specific numbers noted herein are only examples. It is understood that alternative implementations may employ differing values or ranges.

The various illustrations and teachings provided herein can also be applied to systems other than the system described above. The elements and acts of the various examples described above can be combined to provide further implementations of the technology.

Any patents and applications and other references noted above, including any that may be listed in accompanying filing papers, are incorporated herein by reference. Aspects of the technology can be modified, if necessary, to employ the systems, functions, and concepts included in such references to provide further implementations of the technology.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

While certain aspects of the technology are presented below in certain claim forms, the applicant contemplates the various aspects of the technology in any number of claim forms. For example, while only one aspect of the technology is recited as a means-plus-function claim under 35 U.S.C. § 112, sixth paragraph, other aspects may likewise be embodied as a means-plus-function claim, or in other forms, such as being embodied in a computer-readable medium. (Any claims intended to be treated under 35 U.S.C. § 112, ¶ 6 will begin with the words "means for.") Accordingly, the applicant reserves the right to add additional claims after filing the application to pursue such additional claim forms for other aspects of the technology.

We claim:

1. A printer comprising:
   an antenna configured to intercept radio waves modulated with printing data;
   a receiver configured to recover the printing data from the intercepted radio waves;
   a printing module, when executed by a processor, being configured to generate a printed output on a printing medium based on the printing data; and
   a housing for the printer, wherein the antenna is integrated with the housing to cover at least a portion of the printer, and wherein the antenna is printed on a non-conductive piece of adhesive film and is sandwiched between non-conductive layers of a portion of the housing.

2. The printer of claim 1, further comprising:
   a transmitter configured to generate a transmission radio frequency carrier wave modulated with transmission data, wherein the antenna is further configured to radiate the transmission radio frequency carrier wave, and wherein the antenna is formed within an interior portion of an upper half of the housing.

3. The printer of claim 1, wherein the intercepted radio waves are generated by a barcode scanner, and wherein the printing data is a barcode scanned by the barcode scanner.

4. The printer of claim 1, wherein the antenna is mechanically coupled to the housing via a molded interconnect device (MID) process.

5. The printer of claim 1, wherein the antenna is positioned to reduce interference from metallic components of the printer.

6. The printer of claim 1, wherein the antenna is configured to receive the radio waves in a frequency range used by IEEE 802.11 standards.

7. The printer of claim 1, wherein the antenna is configured to receive the radio waves in a frequency range used by Bluetooth standards.

8. The printer of claim 1, wherein the antenna is positioned to wrap around an interior of the housing, proximate to a periphery of the housing.

9. A method of printing data with a printer, the method comprising:

intercepting electromagnetic carrier waves with an antenna and converting the electromagnetic carrier waves to electrical signals with the antenna, wherein the antenna is integrated with a housing of the printer to cover at least a portion of the printer, wherein the antenna is formed on a surface of a portion of the housing of the printer so that the antenna is sandwiched between non-conductive layers of the housing of the printer, and wherein the electromagnetic carrier waves are modulated with printing data;

filtering the printing data from the electrical signals to recover the printing data; and generating, based on the printing data, a printed output on a physical medium.

10. The method of claim 9, further comprising:

generating a transmission carrier wave modulated with transmission data; and radiating the transmission carrier wave with the antenna, wherein the transmission data pertains to a status of a print request or a status of the printer.

11. The method of claim 9, further comprising using a molded interconnect device (MID) process to integrate the antenna with the housing of the printer.

12. The method of claim 9, wherein the antenna integrated with the housing is mechanically coupled to an inside surface of the housing, proximate to a periphery of the housing.

13. The method of claim 9, wherein the antenna integrated with the housing is positioned to wrap around at least a portion of the housing.

14. The method of claim 9, wherein the antenna integrated with the housing is positioned to reduce interference of the electromagnetic carrier waves with metallic components of the printer.

15. The method of claim 9, wherein the electromagnetic carrier waves are generated by a barcode scanner, and wherein the printing data is a barcode scanned by the barcode scanner.

16. The method of claim 9, wherein the intercepted electromagnetic carrier waves have a frequency in a range specified by Bluetooth standards or in a range specified by IEEE 802.11 standards.

17. The method of claim 9, wherein the antenna is printed on a non-conductive piece of adhesive film that is configured to be sandwiched between the non-conductive layers.

18. A printer comprising:

an antenna configured to sense radio frequency carrier waves carrying printing information;

a receiver for extracting the printing information from the sensed radio frequency carrier waves;

a hardware print module, when executed by a processor, being configured for printing at least some of the printing information on a printing medium; and a shell for the printer, wherein the antenna is integrated with the shell to cover at least a portion of the printer, and wherein the antenna is printed on a non-conductive piece of adhesive film that is attached to a surface of the shell.

19. The printer of claim 18, further comprising:

means for generating a transmission radio frequency carrier wave modulated with transmission data, wherein the antenna is further configured to radiate the transmission radio frequency carrier wave, and wherein the transmission data relates to the printer or a print request sent to the printer.

20. The printer of claim 18, wherein the antenna is formed in a portion of the shell of the printer so that the antenna is sandwiched between non-conductive layers of the shell of the printer.

* * * * *